United States Patent [19]

Merrill

[11] 4,349,208
[45] Sep. 14, 1982

[54] UNITARY SKI-SLED

[76] Inventor: Max H. Merrill, R.F.D. #1, Rutland, Vt. 05701

[21] Appl. No.: 171,487

[22] Filed: Jul. 23, 1980

[51] Int. Cl.³ .............................................. B62B 13/16
[52] U.S. Cl. .................................................. 280/12 K
[58] Field of Search ............... 280/12 K, 12 H, 12 R, 280/21 R, 25, 28, 27

[56] References Cited

U.S. PATENT DOCUMENTS

| D. 157,137 | 2/1950 | Foster | 280/12 K X |
| D. 162,423 | 3/1951 | Kotchan | D34/15 |
| D. 178,325 | 7/1956 | Nelson | D34/15 |
| D. 232,164 | 7/1974 | Bemis et al. | 280/12 K X |
| 768,778 | 8/1904 | Clark et al. | 280/12 K |
| 1,954,830 | 4/1934 | Richards | 280/12 K X |
| 2,841,406 | 7/1958 | Brandon | 280/12 B |
| 2,963,299 | 12/1960 | Smith | 280/25 |
| 3,190,668 | 6/1965 | Husak | 280/12 K |
| 3,297,334 | 1/1967 | Jenks | 280/12 K |
| 3,301,569 | 1/1967 | Broschart | 280/25 |
| 3,325,179 | 6/1967 | Bissett | 280/25 |
| 3,336,038 | 8/1967 | Cohen | 280/12 K |
| 3,617,070 | 11/1971 | Roberts | 280/28 X |
| 3,744,811 | 7/1973 | Johnston | 280/12 K |
| 3,778,077 | 12/1973 | Johnson | 280/12 K |
| 3,782,745 | 1/1974 | Stoveken | 280/12 H X |
| 3,830,513 | 8/1974 | Hunt | 280/12 K |
| 3,917,301 | 11/1975 | Fabris | 280/12 K |
| 4,199,162 | 4/1980 | Joy | 280/12 K |

FOREIGN PATENT DOCUMENTS 389419  7/1965  Switzerland .................. 280/12 K Primary Examiner—Joseph F. Peters, Jr.
Assistant Examiner—Michael Mar
Attorney, Agent, or Firm—Saidman & Sterne

[57] ABSTRACT

A ski-sled preferably formed of a single, unitary piece of molded plastic, resulting in a lightweight, durable, inexpensive and readily mass-produced item. The unitary ski-sled consists of three major components: an elongated runner, a seat, and specially designed vertical support members extending between and integrally connecting the top of the runner with the bottom of the seat. The article of manufacture may also include a strut or ridge extending along the longitudinal centerline of the runner for reinforcement purposes.

5 Claims, 5 Drawing Figures

UNITARY SKI-SLED

BACKGROUND OF THE INVENTION

1. Field of the Invention

The present invention relates to a ski-sled and, more particularly, to a ski device having a seat for use over snow.

2. Description of the Prior Art

I am aware of many prior art patents which describe a type of popular recreational device known as a ski-sled, sled-ski, ski-scooter, or the like.

These devices all have the common characteristics of an elongated runner, a seat positioned above the runner, and means extending from the runner to support the seat in an elevated position.

Typical United States Patents include U.S. Pat. Nos.: Des. 162,423; Des. 178,325; Des. 232,104; 768,977; 1,954,830; 2,841,406; 2,963,299; 3,190,668; 3,297,334; 3,301,569; 3,325,179; 3,336,038; 3,617,070; 3,744,811; 3,778,077; 3,830,513; and 3,917,301. I am also aware of German Pat. No. 389,419.

While the prior art is replete with teachings of various types of ski-sleds, as exemplified by the above-noted patents, I have found that all known designs are deficient in the following respects.

Initially, although some of the designs of the prior art are quite sophisticated, many have been advanced with little concern for the cost of construction. Clearly, if an item is to receive widespread public acceptance, it must be designed so as to minimize materials and manufacturing costs. Many of the prior are designs are constructed of relatively expensive materials or a plurality of different materials, and require assembly and construction steps which add further to the cost of the end product.

Another deficiency of the prior art designs is that they are all constructed of a plurality of individual components thereby requiring assembly during production. In addition to adding to the cost of manufacture by requiring assembly of various components, the end products produced thereby have an inherent tendency, as with all assembled products, to break or fail at the points of assembly which may, especially in a device of this type, be subjected to high stresses and wear and tear. In other words, the nails, screws, bolts, springs, telescoping assemblies, turnbuckles, mounting plates, handle bars, footpedals, shock-absorbers, anti-sway linkages, pivot mountings, seats, footrests, telescoping brackets, collapsible arms, and pivot hinges, replete in the prior art noted above, all add, in one measure or another, to increased cost, unnecessary complexity, and consist of possible points of failure for the end product during use.

The prior art devices also tend to be clumsy and heavy, adding further to manufacturing and shipping costs, as well as making the end product less attractive to the ultimate consumer and user.

It is towards overcoming these above-noted deficiencies of prior art ski-sleds that the present invention is advanced.

OBJECTS AND SUMMARY OF THE INVENTION

It therefore a primary object of the present invention to provide a new and improved ski-sled which overcomes the deficiencies noted above with respect to the prior art.

Another object of the present invention is to provide a novel and unique ski-sled which is constructed entirely of an inexpensive and readily available material.

A further object of the present invention is to provide a ski-sled which is constructed of a strong and lightweight material.

A still further object of the present invention is to provide a ski-sled which does not require assembly of the individual components thereof.

An additional overall object of the present invention is to provide a ski-sled which is constructed of a unitary piece of material such as plastic.

The foregoing and other objects are attained in accordance with one aspect of the present invention through the provision of a ski-sled, which comprises an elongated runner, a seat, and means extending from the runner for supporting the seat, the runner, seat and supporting means consisting of a unitary piece of molded plastic. The seat is preferably substantially planar and rectangular and is downwardly inclined from the front portion to the rear portion thereof.

In accordance with more particular aspects of the present invention, the supporting means includes first and second substantially planar support walls, each of which extends transversely across the runner and vertically to the underside of the seat. The first and second walls are preferably substantially parallel to one another while being perpendicular to the upper surface of the runner. The supporting means may further include a center substantially planar support wall that extends perpendicularly between the first and second support walls and the runner substantially along the longitudinal centerline of the runner. A third support wall may also be positioned between and substantially parallel to the first and second support walls. The first, second and third support walls are respectively of gradually increasing height from the rearmost to the frontmost positioned walls thereof, whereby the seat resting on the walls will be inclined. First and second support ridges may also be located along the longitudinal centerline of the upper surface of the runner. The support ridges are integral with and extend away from the first and second walls respectively.

BRIEF DESCRIPTION OF THE DRAWINGS

The foregoing and other objects, aspects, and advantages of the present invention will be better appreciated as the same becomes more fully understood from a consideration of the following detailed description of the present invention when considered in connection with the accompanying drawings, in which.

DETAILED DESCRIPTION OF THE PREFERRED EMBODIMENT

Figure 1:
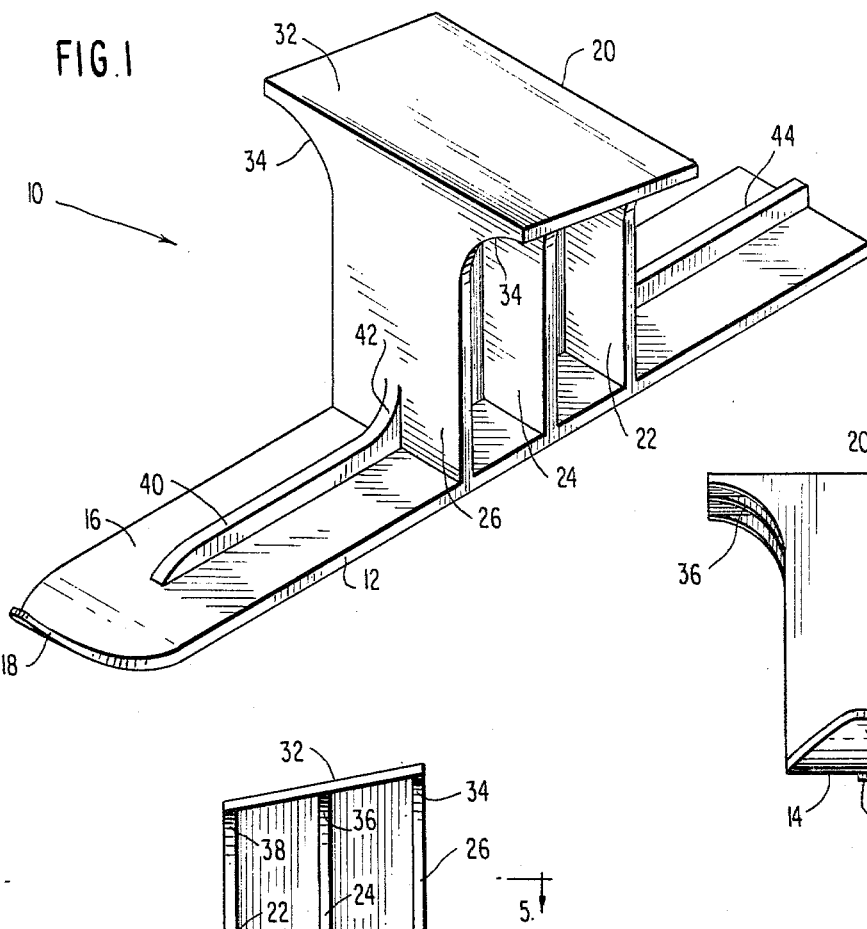
FIG. 1 is a perspective view of a preferred embodiment of the unitary ski-sled of the present invention.
Figure 2:
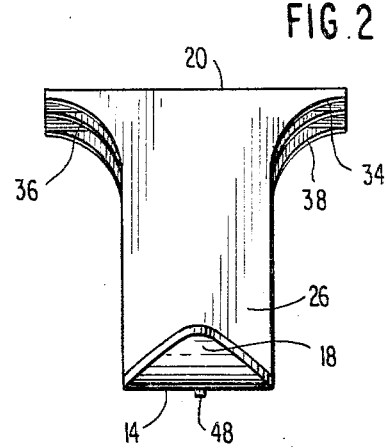
FIG. 2 is a front view in elevation of the preferred embodiment of FIG. 1.

Referring now to the drawings, wherein like reference numerals represent identical or corresponding parts throughout the several views, and more particularly to FIG. 1 thereof, reference numeral 10 indicates generally a preferred embodiment of the ski-sled of the present invention.

The design of the ski-sled 10 of the present invention is such that it may be fabricated of a single, unitary piece of material. Preferably, the material comprises plastic which may be formed in a mold. Many plastic materials would be suitable for constructing the unitary ski-sled 10 of the present invention, such as foam plastic or the like. Foam plastic would provide a strong, lightweight and inexpensive unit which may be readily mass-produced extremely inexpensively. The present invention, being constructed of a single, unitary piece of material, does not require separate components to be assembled, thereby obviating the need for nuts, bolts, springs and the like, which abound in the prior art, as discussed above. The manufacturing proces is therefore extremely simplified, and the end product is less prone to mechanical failure.

The ski-sled 10 of the present invention includes an elongated runner 12 which may be, for example, 34-¾" long and 6" wide. Runner 12 includes a lower, snow-contacting surface 14, and a top surface 16, both of which are preferably substantially planar. At the front portion of runner 12 is formed an upwardly curved tip 18, as is common in the ski art.

Reference number 20 indicates an integrally formed seat or support surface which extends upwardly from the top surface 16 of runner 12. The seat supporting means includes in the illustrated embodiment three transversely extending planar upright support walls 22, 24 and 26 which extend integrally from top surface 16 of runner 12. In a smaller version of the present invention, the middle support wall 24 may not be necessary.

Support wall 22 is perpendicular to runner 12 and extends transversely across the entire width of top surface 16 of runner 12 to the rearmost edge of seat 32. Front wall 26 is parallel to rear wall 22 and also extends transversely across the entire width of top surface 16 of runner 12 upwardly to the front edge of seat 32. Middle wall 24 is positioned parallel to and midway between rear wall 22 and front wall 26 and extends to the approximate midpoint of seat 32.

In the illustrated embodiment, front wall 26 may be on the order of 12" high, for example, while walls 24 and 22 are of slightly decreasing height with respect to front wall 26 so that seat 32 will be slightly inclined at, for example, a 10° angle to the horizontal, from the front portion thereof downwardly towards the rear portion thereof. The angular inclination of seat 32 may provide better support for a user.

Figure 3:
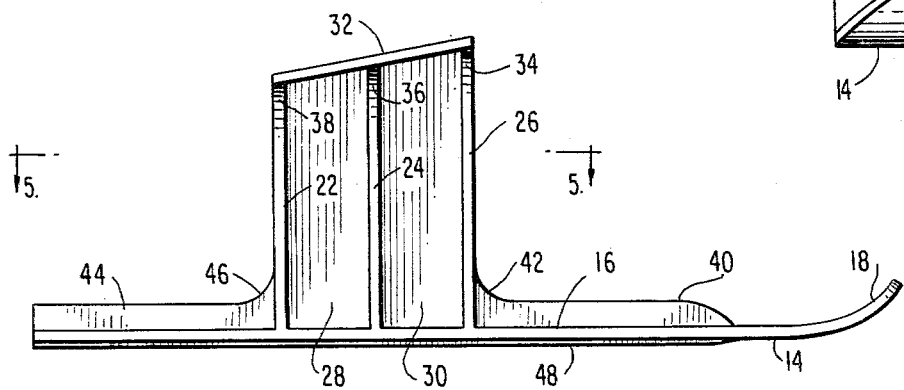
FIG. 3 is a side view in elevation of the preferred embodiment illustrated in FIG. 1.
Figure 4:
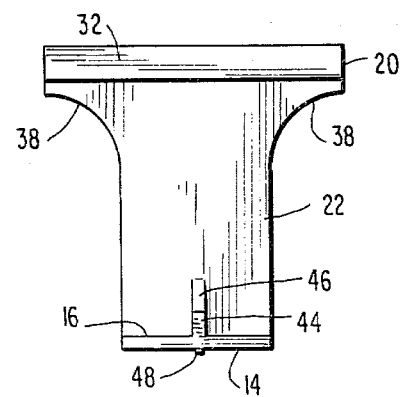
FIG. 4 is a rear view in elevation of the preferred embodiment illustrated in FIG. 1.
Figure 5:
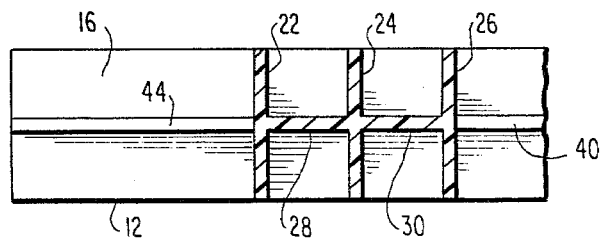
FIG. 5 is a sectional view of the preferred embodiment of the present invention illustrated in FIG. 3 and taken along line 5—5 thereof.

As illustrated more particular in FIGS. 3 and 5, a pair of center substantially planar support walls 28 and 30 extend longitudinally and perpendicularly to walls 22, 24 and 26. Support walls 28 and 30 are preferably located along the longitudinal centerline of runner 12 so as to provide increased support for the seat 32. Seat 32 is preferably rectangular and, in the illustrated embodiment, may be, for example, 8" wide and 12" long.

The vertical support walls 22, 24 and 26 include upper curved portions 38, 36 and 34, respectively to provide continuous and distributed support for the seat 32. Other shapes of support walls are clearly, however, within the scope of the present invention.

A pair of support ridges 40 and 44 are also preferably provided along the longitudinal centerline of the top surface 16 of runner 12. Ridges 40 and 44 are preferably terminated in curved integrally formed portions 42 and 46 for providing additional support to front and rear vertical support walls 26 and 22, respectively. Also, on the underside surface 14 of runner 12, a lower guide ridge 48 may be provided.

As may be appreciated in particular from FIGS. 3 and 5, the design of the present invention is particularly amenable to production in a mold. The planar surfaces and unique support design lend themselves to molded production by providing two mirror-image mold halves which mate along the longitudinal centerline of the unit. The resultant one-piece unitary construction obviates the need for further assembly, materially reduces the cost of manufacture, and results in a lightweight, strong and inexpensive end product.

Obviously, numerous modifications and variations of the present invention are possible in light of the above teachings. It is therefore to be understood that within the scope of the appended claims, the invention may be practiced otherwise than as specifically described herein.

I claim as my invention:

1. A ski-sled, composed of a unitary piece of material molded in a two-piece, mirror-image mold whose halves mate along the longitudinal centerline of the ski-sled, and having:
   (a) a runner portion having a substantially planar, lower snow-contacting surface, a substantially planar top surface, and an upwardly curved front tip;
   (b) a substantially rectangular and planar seat portion inclined downwardly from its front edge to its rear portion at an angle to the horizontal;
   (c) a first planar, transverse, upright support wall portion extending integrally and substantially perpendicularly from the top surface of the runner to the front edge of the seat;
   (d) a second, planar, transverse, upright support wal portion extending integrally and substantially perpendicular from the top surface of the runner to the rear edge of the seat;
   (e) a third, planar, transverse, upright support wall portion extending integrally from the top surface of the runner to the seat intermediate said first and second support walls; and
   (f) a lower guide ridge extending integrally from and along the lower, snow-contacting surface of the runner.

2. A unitary, molded ski-sled according to claim 1, further comprising a fourth, planar support wall portion extending along the centerline of the runner, perpendicularly to and integrally between the first and second support walls and between the top of the runner and the seat.

3. A unitary, molded ski-sled according to claim 1 or 11, further comprising a first support ridge portion extending along the centerline of the runner from the top surface of the runner and the lower portion of the first support wall toward the upwardly curved front tip of the runner.

4. A unitary, molded ski-sled according to claim 3, further comprising a second support ridge portion extending along the centerline of the runner from the top surface of the runner and the lower portion of the second support wall toward the rear of the runner.

5. A ski-sled, composed of a unitary piece of material molded in a two-piece, mirror-image mold whose halves mate along the longitudinal centerline of the ski-sled, and having:

(a) a runner portion having a substantially planar, lower snow-contacting surface, a substantially planar top surface, and an upwardly curved front tip;

(b) a substantially rectangular and planar seat portion inclined downwardly from its front edge to its rear portion at an angle to the horizontal;

(c) a first planar, transverse, upright support wall portion extending integrally and substantially perpendicularly from the top surface of the runner to the front edge of the seat;

(d) a second, planar, transverse, upright support wall portion extending integrally and substantially perpendicularly from the top surface of the runner to the rear edge of the seat;

(e) a first supporting ridge portion extending along the centerline of the runner from the top surface of the runner and lower portion of the first support wall toward the upwardly curved front tip of the runner and a second support ridge portion extending along the centerline of the runner from the top surface of the runner and the lower portion of the second support wall toward the rear of the runner; and (f) a lower guide ridge extending integrally from and along the lower, snow-contacting surface of the runner.

* * * * *